United States Patent [19]

Yasuki et al.

[11] Patent Number: 4,855,815
[45] Date of Patent: Aug. 8, 1989

[54] DIGITAL COMPOSITE COLOR VIDEO SIGNAL SEPARATING CIRCUIT WITH VERTICAL CORRELATION WEIGHTING FUNCTION

[75] Inventors: Seijiro Yasuki; Kiyoshi Hoshino, both of Yokohama, Japan

[73] Assignee: Kabushiki Kaisha Toshiba, Kawasaki, Japan

[21] Appl. No.: 243,842

[22] Filed: Sep. 13, 1988

[30] Foreign Application Priority Data

Sep. 18, 1987 [JP] Japan ................ 62-233935

[51] Int. Cl.$^4$ .............................................. H04N 9/78
[52] U.S. Cl. ........................................................ 358/31
[58] Field of Search .............................. 358/31, 20, 40

[56] References Cited

U.S. PATENT DOCUMENTS

| | | | |
|---|---|---|---|
| 4,644,389 | 2/1987 | Nakagawa | 358/31 |
| 4,703,342 | 10/1987 | Takahashi | 358/31 |
| 4,727,415 | 2/1988 | Nakagawa | 358/31 |
| 4,809,060 | 2/1989 | Saeki | 358/31 |

OTHER PUBLICATIONS

K. Kawai et al,; "IDV Receiver". IEEE Trans. CE vol. CE-33, No. 3, Aug. 1987.
Nishigori et al,; "A Two Dimensional Adaptive Digital Decoder for Color Television Signals", IEEE Tarns. CE vol. CE-33, No. 3, Aug. 1987.

*Primary Examiner*—Tommy P. Chin
*Attorney, Agent, or Firm*—Cushman, Darby & Cushman

[57] ABSTRACT

A first delay circuit delays a digital composite color video signal by a one-scanning-line time. A second delay circuit delays the output signal of the first delay circuit by the one-scanning-line time. A first correlation detector detects a correlation between the digital composite color video signal and the output signal of the first delay circuit. A second correlation detector detects a correlation between output signals of the first and second delay circuits. A coefficient generator generates first and second coefficients corresponding to magnitudes of the correlation-detect outputs of first and second correlation detectors. A first difference-signal detector detects a difference signal of the digital composite color video signal and the output signal of the first delay circuit. A second difference-signal detector detects a difference signal of the output signals of the first and second delay circuits. A first weighting section weights the difference signal from the first difference-signal detector with the first coefficient provided from the coefficient generator. A second weighting section weights the difference signal from the second difference-signal detector with the second coefficient provided from the coefficient generator. A chrominance signal component outputting section adds together output signals of the first and second weighting sections to separate and output a chrominance signal component contained in the digital composite color video signal.

11 Claims, 4 Drawing Sheets

DIGITAL COMPOSITE COLOR VIDEO SIGNAL SEPARATING CIRCUIT WITH VERTICAL CORRELATION WEIGHTING FUNCTION

BACKGROUND OF THE INVENTION

1. Field of the Invention

This present invention relates to a digital composite color video signal separating circuit with a vertical correlation weighting function, and more particularly, to a composite signal separating circuit in a color television receiver.

2. Description of the Related Art

In an existing color television system, a carrier chrominance signal C is superimposed on a luminance signal Y to provide a composite video signal. For this reason, color television receivers need a circuit adapted to separate the composite video signal into the luminance signal Y and the carrier chrominance signal C, that is a Y/C separating circuit.

Owing to recent advances in digital techniques, conventional Y/C separating circuits of analog type have been developed into digital Y/C separating circuits for separating the luminance and chrominance signals after conversion of the composite picture signal to digital form.

For example, conventional analog Y/C separating circuits use a low pass filter for separation in a horizontal direction of the composite video signal, with the result that the horizontal resolution of the luminance signal is reduced considerably. To eliminate such a drawback, Y/C separation circuits have been developed which perform, after conversion of the composite color signal to a digital signal, arithmetic operations of the digital signal with respect to the vertical direction of a television picture by the use of line memories.

FIG. 5 shows a conventional digital Y/C separating circuit.

An input circuit 401 is connected to receive a digital composite color signal provided from an analog-to-digital conversion circuit (not shown) which performs the analog-to-digital conversion of an analog composite color signal by means of a clock signal with a frequency of 4fsc (fsc=color subcarrier frequency), for example. The digital composite color signal is applied to a line memory 402, which delays the composite color signal by 910 samples, and an adder 405. The output of line memory 402 is coupled to inputs of adders 405, 406 and 404 and a line memory 403.

Adder 405 calculates a difference between the input digital composite color video signal and the delayed digital composite color video signal from line memory 402 and then feeds the result to adder 407. Adder 406 calculates a difference between the one-scanning-line delayed (910-sample-delayed) composite color signal from line memory 402 and the two-scanning-line delayed (2+910-sample-delayed) composite color signal from line memory 404 and provides the result to adder 407. An output signal of adder 407 has its unwanted components removed by a bandpass filter 408 and is then led to an output terminal 410 as a digital chrominance signal (C signal). This is because, in the NTSC system, subcarriers on the upper or lower lines against a line are opposite in phase to each other. The output of bandpass filter 408 is coupled to a minus input of adder 404 so that the luminance signal (Y signal) is separated from the composite signal and taken from an output terminal 409.

With the digital Y/C separating circuit, as described above, the Y signal and C signal can be separated with little degradation of the resolution of the luminance signal.

In the NTSC system which is one of existing color television systems, a limitation on the horizontal bandwidth of the chrominance signal is standardized, but no vertical bandwidth limitation exists. Therefore, the chrominance signal may mix with the luminance signal. In the digital Y/C separating circuit, the leak of the chrominance signal in the luminance signal may produce dot crawl which degrades the picture quality. When an oblique component in the luminance signal is high, the luminance signal leaks in the chrominance signal, resulting in cross-color.

The above problems will be discussed in detail with reference to FIG. 6. Assume now that composite-signal waveforms a, b and c on three scanning lines abruptly vary between a and b in the vertical direction. In the conventional digital Y/C separating circuit using line memories, subtractions are performed between the waveforms a and b and between the waveforms b and c, and the results are added together. As can be seen from a waveform d, therefore, the vertical abrupt variations in the composite-signal waveforms make the sufficient separation of the C signal and the Y signal difficult. As a result, the C signal will leak in the Y signal, resulting in the dot crawl. Further, the Y signal will also leak in the C signal, thereby producing the cross-color.

As described above, the conventional digital Y/C separating circuit using line memories can prevent the degradation in the resolution of the luminance signal. However, if the chrominance signal and the luminance signal have a wide bandwidth, then the picture quality will be degraded because of the cross-color and the dot crawl due to the imperfect separation of the signals.

SUMMARY OF THE INVENTION

It is accordingly an object of the present invention to provide a new and improved digital composite color video signal separating circuit with a vertical correlation weighting function which can attain the separation of luminance and chrominance signals without the degradation of picture quality even when the luminance signal is wide in bandwidth.

According to the present invention there is provided a digital composite color video signal separating circuit comprising:

first delay means connected to receive a digital composite color video signal for delaying the digital composite color video signal by a one-scanning-line time;

second delay means connected to receive an output signal from said first delay means for delaying the output signal by the one-scanning-line time;

first correlation detecting means connected to receive the digital composite color video signal and the output signal from said first delay means for detecting a correlation therebetween;

second correlation detecting means connected to receive output signals from said first and second delay means for detecting a correlation therebetween;

coefficient generating means connected to receive correlation-detect outputs from said first and second correlation means for generating first and second coefficients corresponding to magnitudes of the correlation-detect outputs;

first difference-signal detecting means connected to receive the digital composite color video signal and the output signal from said first delay means for detecting a difference signal thereof;

second difference-signal detecting means connected to receive the output signals from said first and second delay means for detecting a difference signal thereof;

first weighting means for weighting the difference signal from said first difference-signal detecting means with the first coefficient provided from said coefficient generating means;

second weighting means for weighting the difference signal from said second difference-signal detecting means with the second coefficient provided from said coefficient generating means; and chrominance signal component outputting means for adding together output signals from said first and second weighting means to separate and output a chrominance signal component contained in the digital composite color video signal.

BRIEF DESCRIPTION OF THE DRAWINGS

Other objects and advantages of the present invention can be understood through the following embodiment by reference to the accompanying drawings, in which.

DETAILED DESCRIPTION OF THE PREFERRED EMBODIMENT

A basic arrangement of the present invention will first be described.

Figure 1:
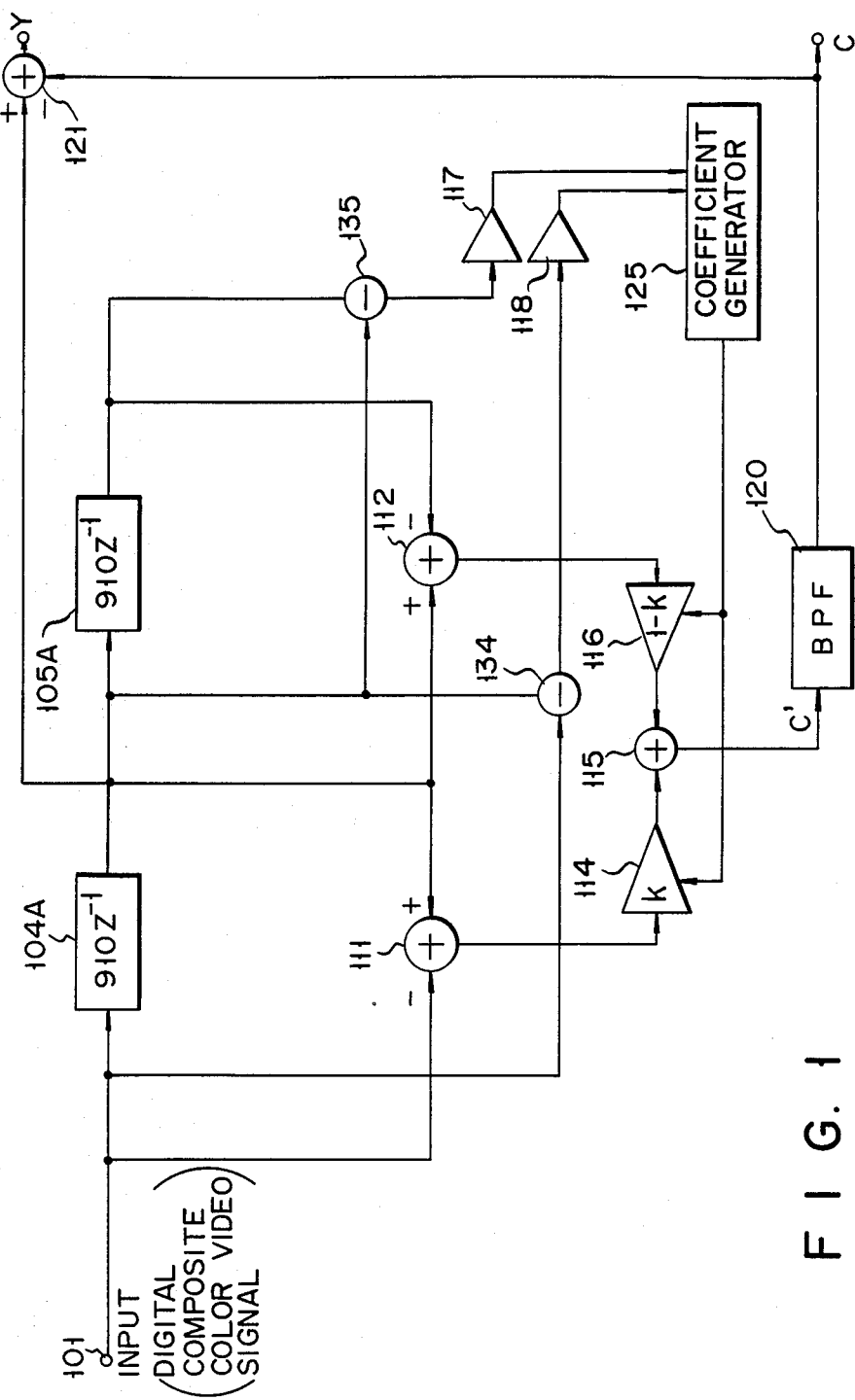
FIG. 1 is a block diagram illustrating a basic arrangement of a digital composite color video signal separating circuit of the present invention.

As shown in FIG. 1, the present invention uses a signal from a first section 101 receiving a digital composite color video input signal, an output signal of a second section 104A which delays the signal from first section 101 by a time corresponding to one scanning line (a one-scanning-line time), and an output signal of a third section 105A which further delays the output signal of second section 104A by the one-scanning-line time. A signal representing a difference between the input signal to first section 101 and the output signal of second section 104A is taken out of an adder 111 and then applied to a first coefficient multiplier 114. A signal representing a difference between the output signals of second and third sections 104A and 105A is taken from an adder 112 and then applied to a second coefficient multiplier 116. Further, a difference signal of the input signal to first section 101 and the output signal of second section 104A is derived from a subtracter 134 and then applied to a first absolute-value circuit 118. A subtracter 134 provides and applies a difference signal of the output signals of second and third sections 104A and 105A to a second absolute-value circuit 117. And, output signals of first and second absolute-value circuits 118 and 117 are applied to a coefficient generator 125. Coefficient generator 125 decides as to which of the absolute-value outputs exhibits a higher vertical correlation, or which of the absolute-value outputs indicates a smaller interline difference, and increases the weighting coefficient in one of first and second coefficient multipliers 114 and 116 that corresponds to the higher vertical correlation. Output signals of first and second coefficient multipliers 114 and 116 are added together in an adder 115. The resultant sum signal is used at least as a chrominance signal component C' separated from the digital composite signal.

The luminance signal (Y) component can be derived, like the prior art, from an adder 121 as a difference signal of an output signal of a bandpass filter 120 connected to receive the chrominance signal component C' from adder 115 and the output signal from second section 104A.

The arrangement can avoid problems of the dot crawl and the like because the weighting coefficient for separation between lines on which the frequency of vertical components in the luminance signal is low (vertical correlation is high) is made larger than that for separation between lines on which the frequency of the vertical components in the luminance signal is high.

An embodiment of the present invention will be described hereinafter.

Figure 2:
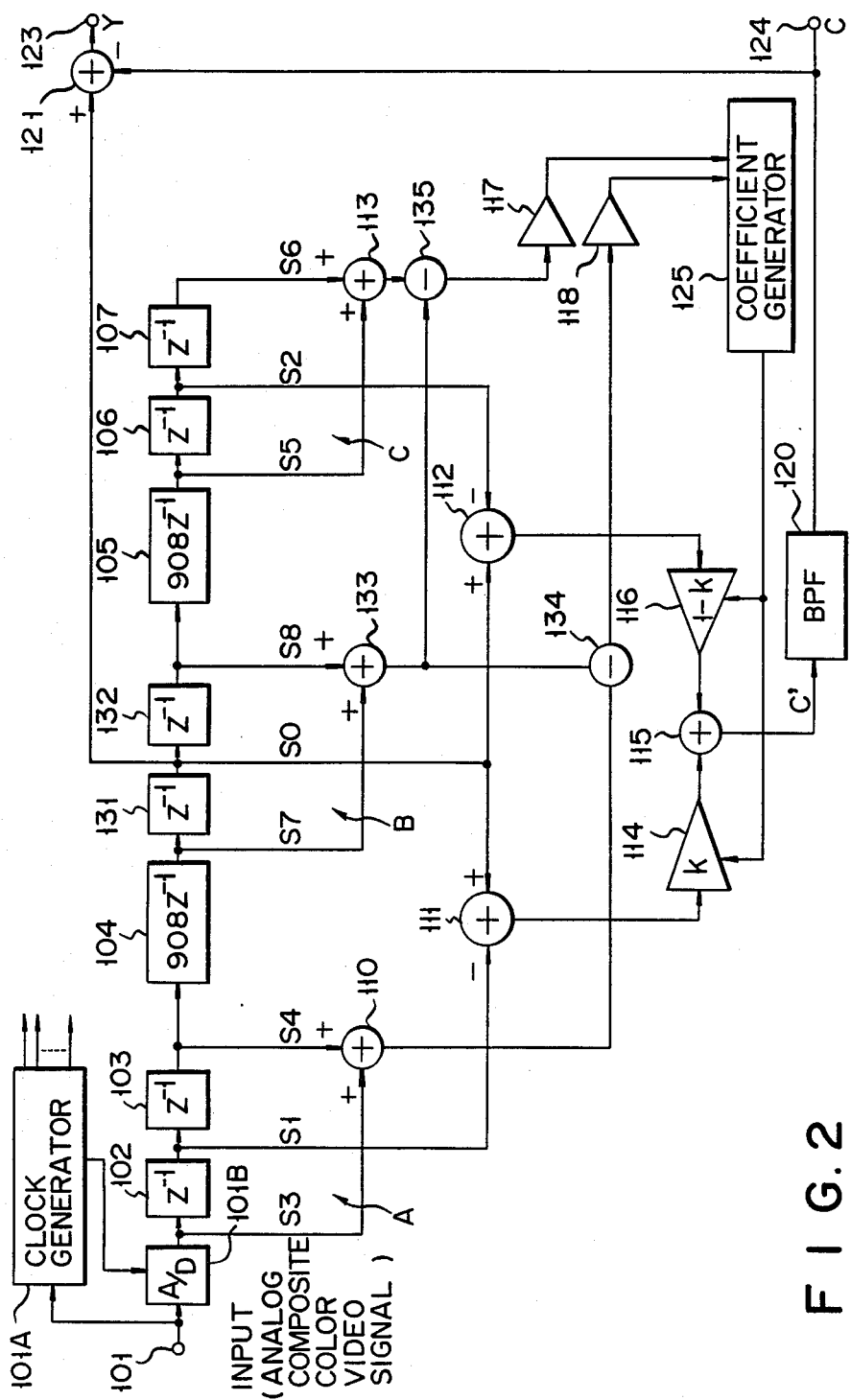
FIG. 2 is a block diagram of a digital composite color video signal separating circuit according to an embodiment of the present invention.

Referring now to FIG. 2, an analog composite color video signal applied to an input terminal 101' is subjected to analog-to-digital (A/D) conversion in an A/D converter 101B responding to a clock signal of 4fsc provided from a clock generator 101A, and then applied to a unit delay element 102 adapted for one-clock-time delay and an adder 110. An output signal of unit delay element 102 is transmitted through a unit delay element 103, a delay element 104 adapted for 908-clock-time delay, unit delay elements 131, 132, a 908-clock delay element 105 and unit delay elements 106, 107 to an adder 113.

A first processing unit A is comprised of unit delay elements 102, 102 and an adder 110. An output signal of processing unit A is fed to a second processing section B providing a time delay of one scanning line. The second processing section B is comprised of delay element 104 and unit delay elements 131 and 132 and adder 133. An output signal of second processing section B is applied to a third processing unit C having a time delay of one scanning line. The third processing section C is comprised of delay element 105 and unit delay elements 106 and 197 and adder 113.

An output signal from an intermediate output of the first processing section A, that is, an output between unit delay elements 102 and 103 and an output signal from an intermediate output of the second processing section B, i.e., an output between unit delay elements 131 and 132 are applied to an adder 111 to produce their difference signal. The difference signal is applied to a coefficient multiplier 114 to be weighted by a control signal from a coefficient generator 125 described later and then applied to an adder 115.

An output signal from an intermediate output of the second processing section B, specifically the output between unit delay elements 131 and 132 and an output signal from an intermediate output of the third processing section C, specifically an output between unit delay elements 106 and 107 are applied to an adder 112 to produce their difference signal. The difference signal is applied to a coefficient multiplier 116 to be weighted by a control signal from coefficient generator 125 and then applied to adder 115.

To detect two lines having a higher vertical correlation therebetween among three scanning lines in one field in the input video signal, the following processes are performed.

The input signal to unit delay element 102 and the output signal from unit delay element 103 are applied to adder 110, and the resultant sum signal is applied to an input of a subtracter 134. The other input of subtracter 134 is supplied with a sum signal of the input signal to unit delay element 131 and the output signal from unit delay element 132 provided from adder 133. The sum signal is also applied to an input of a subtracter 135 the other input of which is connected to receive a sum signal of input signal to unit delay element 106 and the output signal from unit delay element 107 provided from adder 113. The output signals of subtracters 134 and 135 are applied to absolute-value circuits 117 and 118, respectively. The outputs of absolute-value circuits 117 and 118 are coupled to coefficient generator 125.

Coefficient generator 125 detects smaller one of the absolute values provided from the absolute-value circuits, that is, two lines, among three lines, which has a higher vertical correlation and then correspondingly controls the weighting coefficient of coefficient multiplier 114 or 116. In this case, the weighting coefficient associated with the two lines having a higher vertical correlation is made larger. When one of coefficient multipliers 114 and 116 has a coefficient of k, the other has a coefficient of 1-k. The output signals of coefficient multipliers 114 and 116 are added together in adder 115 and then applied to a bandpass filter 120 for separation and extraction of the chrominance signal C through an output terminal 124. The chrominance signal C is applied to an adder 121 to be subtracted from the output signal of unit delay element 131. Thus, adder 121 separates the luminance signal Y from the composite signal and provides it to an output terminal 123. It is to be noted that the clock signal of 4fsc is also applied to delay elements 102–107, 131 and 132 from clock generator 101A.

Figure 3:
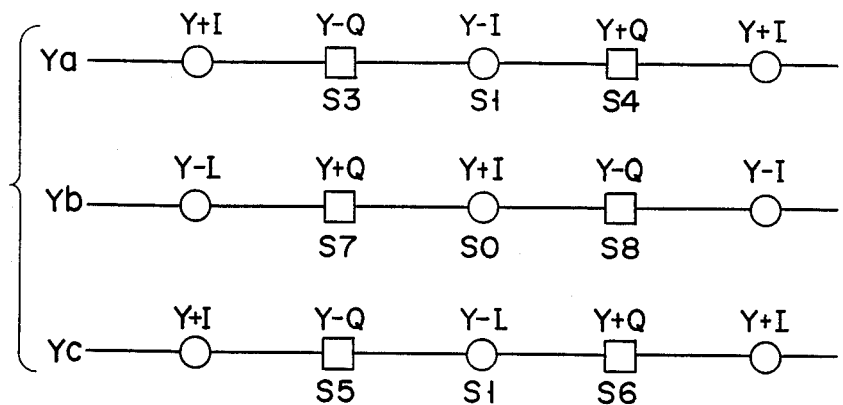
FIG. 3 is a diagram useful for explaining the operation of the circuit of FIG. 2.

The operation of the embodiment will be described with reference to FIGS. 2 and 3.

It is assumed that the digital composite color video signal to input terminal 101 is sampled by clocks of 4fsc as in the prior art which are synchronized with the I and Q axes. If S3 is the digital composite color video signal, S1 the output of unit delay element 102, S4 the output of unit delay element 103, S7 the output of delay element (line memory) 104, S0 the output of unit delay element 131, S8 the output of unit delay element 132, S5 the output of delay element 105, S2 the output of unit delay element 106, and S6 the output of unit delay element 107, then data arrangements on scanning lines Ya, Yb and Yc will be indicated as shown in FIG. 3.

Adder 110 performs an operation of S3+S4 to output signals on the scanning line Ya, and adder 133 performs an operation of S7+S8 to provide signals on the scanning line Yb. Adder 113 performs an operation of S5+S6 to provide signals on the scanning line Yc.

The outputs of adders 134 and 135 will be $$D1 = Ya - Yb$$

$$D2 = Yc - Yb$$

Coefficient generator 125 examines D1 and D2 to provide the coefficient k represented by $$k = f(D1, D2)$$

The conversion can be realized by, for example, $$k = D2/(D1+D2)$$

$$1-k = D1/(D+D2) (k \leq 1)$$

or by $$k = f(D1-D2)$$

The output signal C' of adder 115 representing the chrominance signal component C will be given by $$C' = k(S0-S1) + (1-k)(S0-S2)$$

Figure 4:
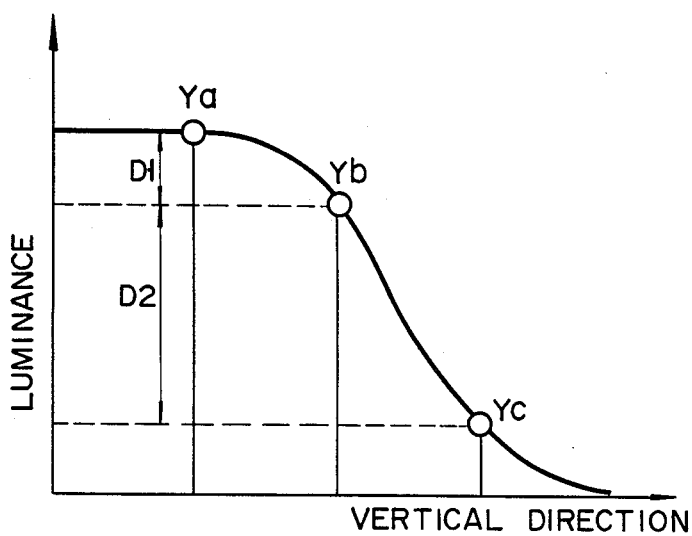
FIG. 4 is a diagram useful for explaining the operation of the circuit of the present invention.
Figure 5:
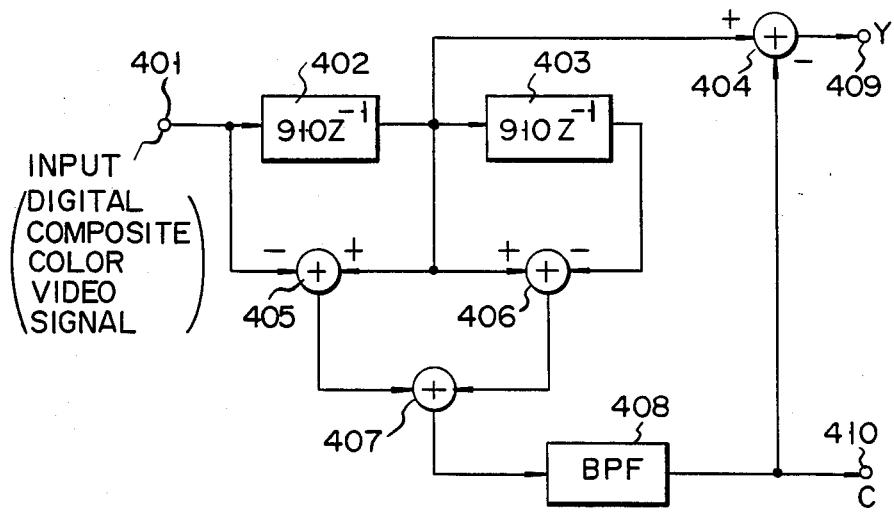
FIG. 5 is a circuit diagram of a prior art digital Y/C separating circuit.
Figure 6:
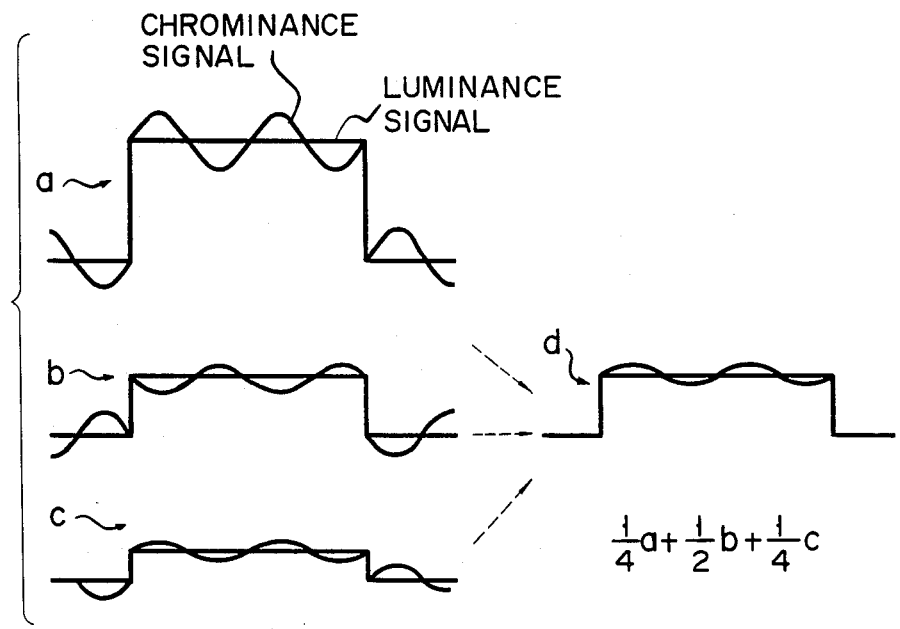
FIG. 6 illustrates signal waveforms for explaining problems in the prior art circuit.

The weighting coefficients k and b 1−k are determined by an output signal of coefficient generator 125. The purpose of control of the weighting coefficients is, as shown in FIG. 4, to make small the weighting coefficient for the operational output between two adjacent lines (Ya, Yb; Yb, Yc) having a greater difference in luminance level (a lower vertical correlation) among three scanning lines (Ya, Yb, Yc), while to make large the weighting coefficient for the operational output between the two adjacent lines (Yb, Yc; Ya, Yb) having a smaller difference in the luminance level (a higher vertical correlation). Owing to the control of the weighting coefficients as described above the dot crawl and the cross-color can be reduced, improving the picture quality.

As described above, the present invention is arranged to increase, in separating the chrominance signal from the composite signal, a proportion of the separated output (chrominance signal output) by the use of signals on two adjacent lines having a higher vertical correlation among signals on three scanning lines. Therefore, the leak of the C signals into the Y signal and the reverse leak can be suppressed, providing high-quality pictures.

What is claimed is:

1. A digital composite color video signal separating circuit comprising:
   first delay means connected to receive a digital composite color video signal for delaying the digital composite color video signal by a one-scanning-line time;
   second delay means connected to receive an output signal from said first delay means for delaying the output signal by the one-scanning-line time;
   first correlation detecting means connected to receive the digital composite color video signal and the output signal from said first delay means for detecting a correlation therebetween;
   second correlation detecting means connected to receive output signals from said first and second delay means for detecting a correlation therebetween;
   coefficient generating means connected to receive correlation-detect outputs from said first and second correlation means for generating first and second coefficients corresponding to magnitudes of the correlation-detect outputs;
   first difference-signal detecting means connected to receive the digital composite color video signal and the output signal from said first delay means for detecting a difference signal thereof;

second difference signal detecting means connected to receive the output signals from said first and second delay means for detecting a difference signal thereof;

first weighting means for weighting the difference signal from said first difference-signal detecting means with the first coefficient provided from said coefficient generating means;

second weighting means for weighting the difference signal from said second difference-signal detecting means with the second coefficient provided from said coefficient generating means; and chrominance signal component outputting means for adding together output signals of said first and second weighting means to separate and output a chrominance signal component contained in the digital composite color video signal.

2. A circuit according to claim 1, wherein said first correlation detecting means includes a subtracter for detecting a difference signal of the digital composite color video signal and the output signal of said first delay means; and an absolute-value circuit for providing an absolute value of an output signal of said subtracter.

3. A circuit according to claim 1, wherein said second correlation detecting means includes a subtracter for detecting a difference signal of the output signals of said first and second delay means; and an absolute-value circuit for providing an absolute value of an output signal of said subtracter.

4. A circuit according to claim 1, wherein said coefficient generating means provides k and $1-k$ ($k \leq 1$) as the first and second coefficients.

5. A circuit according to claim 1, wherein said chrominance signal component outputting means includes an adder for adding together the output signals of said first and second weighting means; and a bandpass filter for removing unwanted components from an output signal of said adder.

6. A circuit according to claim 1, further comprising luminance signal component outputting means for detecting a difference signal of the output signal of said first delay means and the chrominance signal component from said chrominance signal component outputting means to separate and output a luminance signal component contained in the digital composite color video signal.

7. A circuit according to claim 1, wherein said first delay means includes first, second, third and fourth delay elements connected in cascade for sequentially delaying the digital composite color video signal by a one-clock time, a one-clock time, a 908-clock time and a one-clock time; and said second delay means includes fifth, sixth, seventh and eighth delay elements connected in cascade for sequentially delaying an output signal of said fourth delay element in said first delay means by a one-clock time, a one-clock time, a b 908-clock time and a one-clock time.

8. A circuit according to claim 7, wherein said first correlation detecting means includes a first adder for adding together the digital composite color video signal and an output signal of said second delay element; a second adder for adding together output signals of said third and fifth delay elements; a first subtracter for detecting a difference signal of output signals of said first and second adders; and a first absolute-value circuit for providing an absolute value of an output signal of said first subtracter; and wherein said second correlation detecting means includes a third adder for adding together output signals of said seventh and eight delay means; a second subtracter for detecting a difference signal of output signals of said second and third adders; and a second absolute-value circuit for providing an absolute value of an output signal of said second subtracter.

9. A circuit according to claim 7, further comprising luminance signal component outputting means for detecting a difference signal of the output signal of said fourth delay means in said first delay means and the chrominance signal component from said chrominance signal component outputting means to separate and output a luminance signal component contained in the digital composite color video signal.

10. A circuit according to claim 7, wherein said first difference-signal detecting means includes a first adder for detecting a difference signal of output signals of said first and fourth delay elements; and wherein said second difference-signal detecting means includes a second adder for detecting a difference signal of the output signal of said fourth delay element in said first delay means and the output signal of said eighth delay element in said second delay means.

11. A composite signal separating circuit for separating a digital composite color video signal in which a first and a second signal are frequency-multiplexed into the first and second signals by the use of a horizontal or vertical operation circuit comprising;

first means for receiving the digital composite color video signal as an input signal;

second means for delaying an output signal of said first means by a on-scanning-line time;

third means for delaying an output signal of said second means by the one-scanning-line time;

means for deriving and providing a difference signal of the output signals of said first and second means to a first coefficient multiplier, and for deriving and providing a difference signal of the output signals of said second and third means to a second coefficient multiplier;

means for obtaining and providing a difference signal of the output signals of said first and second means to a first absolute-value circuit, and for obtaining and providing a difference signal of the output signals of said second and third means to a second absolute-value circuit;

a coefficient generator circuit connected to outputs of said first and second absolute-value circuits for detecting one of absolute values that is higher in vertical correlation, namely, that is smaller in interline difference and increasing the coefficient of one of said first and second coefficient multipliers that is higher in vertical correlation;

means for adding together output signals of said first and second coefficient multipliers to output a separated chrominance signal; and means for subtracting between the output signal from said second means and the separated chrominance signal to output a separated luminance signal.

* * * * *